W. B. FOGH.
RAIN SHIELD FOR AUTOMOBILES.
APPLICATION FILED OCT. 16, 1919.
1,404,950.
Patented Jan. 31, 1922.
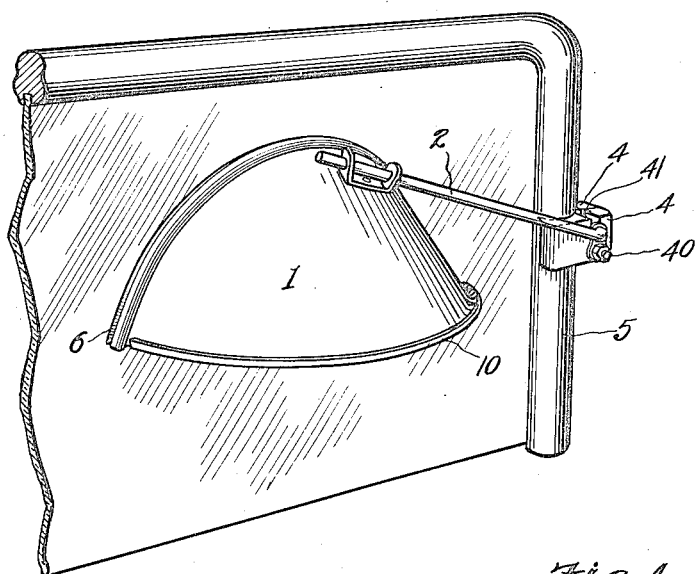
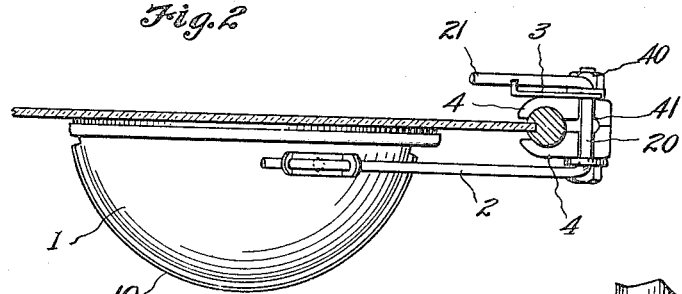
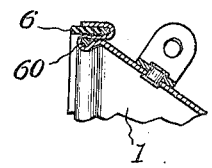
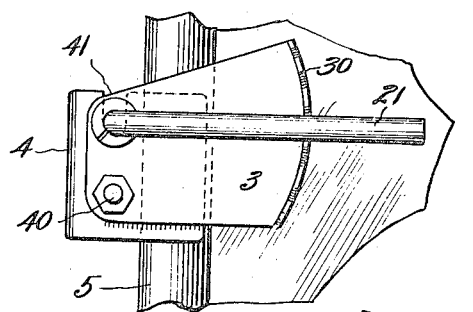
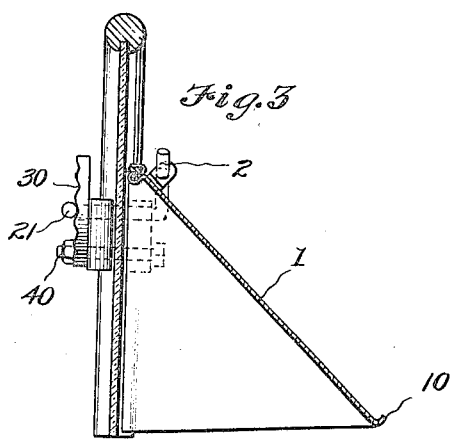
Inventor
Walter B. Fogh
By Reynolds N Cook
Attorney

UNITED STATES PATENT OFFICE.

WALTER B. FOGH, OF SEATTLE, WASHINGTON.

RAIN SHIELD FOR AUTOMOBILES.

1,404,950. Specification of Letters Patent. Patented Jan. 31, 1922.

Application filed October 16, 1919. Serial No. 331,029.

*To all whom it may concern:*

Be it known that I, WALTER B. FOGH, a citizen of the United States, and resident of the city of Seattle, county of King, and State of Washington, have invented certain new and useful Improvements in Rain Shields for Automobiles, of which the following is a specification.

My invention consists of a rain shield adapted for placing upon the wind shields of automobiles so as to protect a portion thereof from the rain, and thus to secure sufficient area which is free from the rain to provide a sufficient field of clear vision for the driver.

The object of my invention is to protect enough of the surface of the wind shield from the rain, so that the driver will at all times have a clear outlook ahead.

In the accompanying drawings I have shown the manner of construction which I prefer to employ.

Fig. 1 shows a perspective view of the device as applied to a wind shield, the same being shown as viewed from a diagonal front position.

Fig. 2 is a top view of the rain shield, the wind shield being in section.

Fig. 3 is a vertical transverse section through the rain and wind shields.

Fig. 4 is a cross section showing on a larger scale the manner of supporting the rain shield and of applying thereto the wiper strip.

Fig. 5 is a view from the rear showing the pivotal support for the rain shield supporting arm.

The rain shield consists of a curved or visor-like plate 1, so shaped as to fit its rear edge against the front surface of the wind shield glass and to project forwardly and downwardly a sufficient distance to catch and convey away the rain and thus to keep a small area of the wind shield immediately in front of the driver clear of the rain, and thus to permit clear vision. This plate 1, may be made of any material which is found suitable. For this purpose I have found a thin sheet of tin to work satisfactorily. Other materials might however, be employed. If this be desired, a transparent material might be used.

This plate is supported by an arm 2, which I prefer to make of such size and material, that it has a measure of resiliency, sufficient to hold the rain shield firmly against the wind shield and accommodate itself to variations which may occur in the position or dimensions of the parts. As illustrated, this arm is composed of a round rod of steel which is not of such size but that it may yield somewhat.

This supporting arm is pivotally supported from one side edge of the wind shield frame and preferably extends to the rear and is, at that point, provided with a lateral extending arm, as 21 by which it may be shifted in position when desired and by which it may also be held in position. To hold it in adjusted position, some means for engaging this inner arm 21 is provided, as, for instance, a plate 3 which is secured to the wind shield frame and has a flange 30, which is notched to receive the arm 21. The natural spring quality of the supporting bar will permit yielding, when sufficient force is applied, to shift the arm 21 from one notch to another.

To support this device upon the wind shield frame, two clamping jaws 4 may be employed; these have fingers which embrace the vertical section 5 of the wind shield frame and that are secured together by a clamping bolt 40. As herein shown these clamping jaws are provided with notches 41, in their upper edge, for the reception of the pivotal section 20 of the supporting arm 2. The plate 3 is also provided with a hole for the reception of the same. It is also provided with a hole for the reception of the clamping bolt 40. It is thus secured firmly in position and will not rock, as it is held in position by the bolt 40 and also by the pivot section 20 of the supporting arm.

The shield 1 has its upper rear edge crimped over, so as to secure a wiper strip 6, of rubber or equivalent material which bears against the front surface of the wind shield glass. By moving the rain shield over the face of the glass, it will clear it of any particles of water which may collect thereon. It thus serves both as a wiper and a shield.

In this same edge of the shield I prefer to have incorporated a stiffening wire 60, which wire I prefer to be made of annealed metal. If made of such material, the shape of the rain shield may be varied by bending it. Being of annealed metal, or metal without a temper, it may be bent and retain its shape.

About the lower curved edge of the shield,

I form a gutter 10, as by slightly turning up the edge. The position of this edge is such as to give a slight inclination towards the outer and rear corners, at which point the gutter is reduced or cut away, so as to discharge the water collected thereon. By doing this, dropping of the water over the front edge of the rain shield is prevented. Should this happen the water would be very likely to be driven back against the face of the wind shield and thus tend to obscure the surface which it is desired to protect.

What I claim as my invention is:

1. A combined rain and glare shield and wiper comprising a visor-like shield having a wiping strip on one edge adapted to fit against the surface on the outside of the windshield, and an arm pivotally supported upon the windshield frame, one end thereof being secured to said visor-like shield and the other end projecting inside the windshield and bent to form a handle to move said shield.

2. A rain shield for automobile wind shields comprising a visor-like body, a supporting arm having a horizontal pivot, a pivot bearing supported upon the wind shield frame, a supporting arm outside of the wind shield and pivoted in said bearing to swing the rain shield in the plane of the wind shield, a resilient holding arm behind the wind shield forming an extension of said supporting arm, and a notched sector adapted to be engaged by said holding arm.

Signed at Seattle, Washington, this 10th day of October, 1919.

WALTER B. FOGH.